United States Patent [19]

Kawasaki

[11] Patent Number: 5,568,944
[45] Date of Patent: Oct. 29, 1996

[54] RESIN HOSE CONNECTING STRUCTURE

[75] Inventor: Minoru Kawasaki, Komaki, Japan

[73] Assignee: Tokai Rubber Industries, Ltd., Komaki, Japan

[21] Appl. No.: 199,196

[22] PCT Filed: Apr. 30, 1993

[86] PCT No.: PCT/JP93/00581

§ 371 Date: Jul. 20, 1994

§ 102(e) Date: Jul. 20, 1994

[87] PCT Pub. No.: WO94/00286

PCT Pub. Date: Jan. 6, 1994

[30] Foreign Application Priority Data

Jun. 29, 1992 [JP] Japan .................... 4-194779

[51] Int. Cl.⁶ .................................. F16L 47/00
[52] U.S. Cl. .................. 285/21.1; 285/236; 285/291; 285/423; 264/513; 138/109
[58] Field of Search ................ 285/423, 21, 238, 285/331, 242, 291, 174, 289, 919, 236; 138/109; 264/513, 267, 259, 279

[56] References Cited

U.S. PATENT DOCUMENTS

| | | | |
|---|---|---|---|
| 3,794,360 | 2/1974 | Bachle et al. | 285/259 X |
| 3,807,776 | 4/1974 | Bingham | 285/238 X |
| 3,920,787 | 11/1975 | McDowell et al. | 285/21 X |
| 4,047,739 | 9/1977 | Aitken | 285/21 |
| 4,083,586 | 4/1978 | Helm | 285/423 X |
| 4,552,384 | 11/1985 | Cyriax | 285/291 X |
| 4,554,949 | 11/1985 | Sell | 285/423 X |
| 4,625,998 | 12/1986 | Draudt et al. | 285/423 X |
| 5,190,322 | 3/1993 | Hughes | 285/236 |
| 5,336,351 | 8/1994 | Meyers | 285/21 X |
| 5,388,870 | 2/1995 | Bartholomew | 285/242 |
| 6,262,718 | 7/1966 | Draudt | 285/242 X |

FOREIGN PATENT DOCUMENTS

| | | |
|---|---|---|
| 0158878 | 10/1985 | European Pat. Off. . |
| 1160833 | 8/1958 | France . |
| 2533996 | 10/1982 | France . |
| 1-221226 | 9/1989 | Japan . |
| 1-261591 | 10/1989 | Japan . |
| 2-145838 | 1/1992 | Japan ................ 285/242 |
| 5-77337 | 3/1993 | Japan . |
| 1036459 | 7/1966 | United Kingdom . |

*Primary Examiner*—Terry Lee Melius
*Assistant Examiner*—Heather Chun Shackelford
*Attorney, Agent, or Firm*—Jacobson, Price, Holman & Stern, PLLC

[57] ABSTRACT

A resin hose connecting structure includes a resin hose including a hose body and a connecting portion formed coaxially and integrally with an end portion of the hose body and having an inserting inner peripheral surface, and a mating member made of structural material having a tubular inserting end portion for inserting into the connecting portion of the resin hose. The tubular inserting end portion includes a ring-shaped contacting surface and an inserting outer peripheral surface. In the hose body, at least the end portion is made of hard thermoplastic resin and is molded by a blow molding method. The connecting portion is made of soft thermoplastic resin and is molded by an injection molding method. The ring-shaped contacting surface of the tubular inserting end portion of the mating member is brought into contact with the end portion of the hose body, and the inserting outer peripheral surface of the tubular inserting end portion is fitted with the inserting inner peripheral surface of the connecting portion. Thereby, the resin hose and the mating member are connected together.

14 Claims, 10 Drawing Sheets

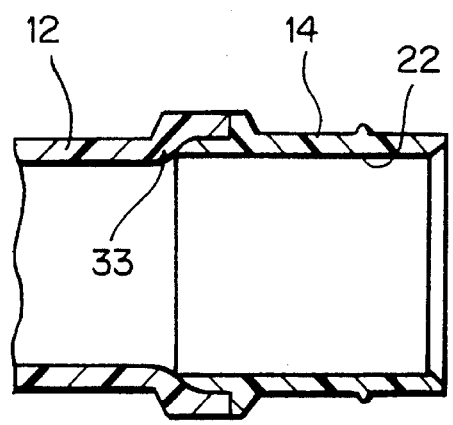
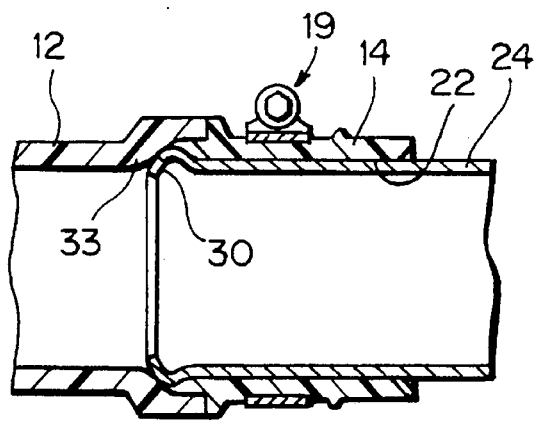
FIG.4(A)  FIG.4(B)
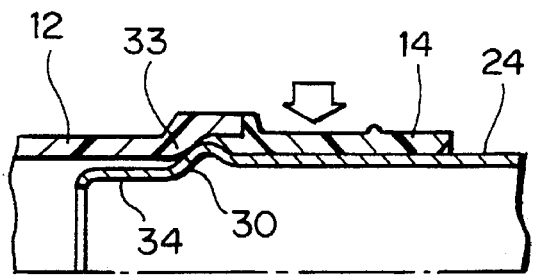
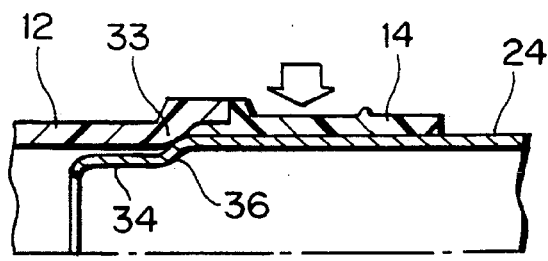
FIG.4(C)  FIG.4(D)
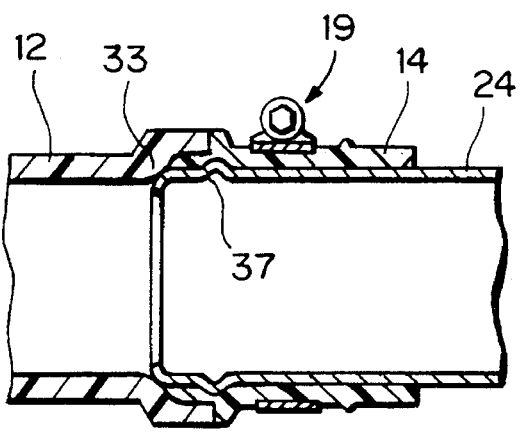
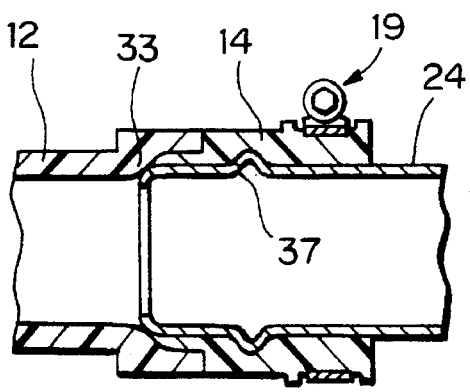
FIG.4(E)  FIG.4(F)

RESIN HOSE CONNECTING STRUCTURE

TECHNICAL FIELD

The present invention relates to a resin hose connecting structure suitable for use as a connecting structure in which an air duct hose, a filler hose or the like is connected with a mating member.

BACKGROUND ART

For example, in the case of an air hose, a filler hose or the like, it is recently examined and actually practiced that a resin hose is used instead of a rubber hose. The resin hose has the following advantages. The resin hose is capable of decreasing weight of the hose in comparison with the rubber hose since the specific gravity of resin is small. The resin hose is capable of forming an integral-mold article comprising a soft portion and a hard portion. The resin hose is capable of selecting a design for a hose-configuration and so on optionally.

In the case of the resin hose, a hard resin material is used as a portion requiring hardness, a soft resin material is used as a portion requiring softness, and it can be accomplished that the hard hose-portion and the soft hose-portion are molded integrally by using two kinds of resin-material.

On the other hand, in the case of the rubber hose, it is difficult to accomplish that the hard hose-portion and the soft hose-portion are molded integrally. In the case of the rubber hose, in general, a metal pipe is used as a portion requiring hardness, a rubber hose is used as a portion requiring flexibility, and thereby both are constructed together.

In the case of the resin hose, as understood from the above-described, the number of parts can be decreased and a production cost can be decreased since the integral-mold hose is formed by molding the soft portion and hard portion together.

In the case of the resin hose, to select the design for a hose-configuration and so on optionally, which means that the hose is sufficiently endurable against deformation when a negative pressure is applied on the hose. In the case of the rubber hose, for example, providing that the hose is in a flat-shape in cross-section, the flat-shape portion is likely to deform. Accordingly, the selection of the design for hose-configuration and so on is restricted in comparison with the resin hose.

By the way, in the case of the resin hose, a blow molding method is preferably used to form the hose. In the blow molding method, a tubular or a bladder-like parison is swelled by blowing an air so that the parison is closely adhered to an inner surface of the mold-die. As a result, the parison is formed in the predetermined shape. Thus, the outer surface of the mold-hose is accurately formed in the predetermined shape by the mold-die, but the inner surface of the mold-hose is formed under the free condition. Therefore, the inner surface of the mold-hose shows bad characteristics in its shape and dimensional accuracy.

In the hose, a mating member is inserted into the inside of the hose-end portion constituting a connecting portion, and both are connected together. In this arrangement, it is required that sealing capacity can be ensured between the mating member and the connecting portion. Providing that the mold-hose shows bad characteristics in its shape and dimensional accuracy, namely, that defects such as an unevenness thickness, an unevenness dimension, a biased thickness, and a ruggedness are generated, the sealing capacity can't be ensured satisfactorily between the mating member and the connecting portion.

Then, in the case of the aforementioned resin hose formed by the blow molding method, the inner surface is polished for finishing-treatment so that the inner surface of the hose is formed in the predetermined accurate shape and dimension.

In the case where the above-mentioned polishing is performed, not only hose forming steps become complicated, but also polishing powders remain at and around the polishing portion. Therefore, a cleaning step for removing the polishing powders is needed, and the hose forming steps become more and more complicated. As a result, the production cost of the hose is increased.

In order to the aforementioned problems, as illustrated in FIG. 9, the present inventors have developed a process invention, in which a hose body 100 is formed by blow-molding thermoplastic resin, and the hose body 100 is disposed in a mold-die 102, next a tubular connecting portion 104 (an end portion of the hose in an axial direction) for connecting a mating member is formed by injection-molding. This invention has been filed as a patent application (Japanese Patent Application No.3-39145).

In this process invention of the patent application; since the inner peripheral surface of the connecting portion 104 can be formed in the predetermined shape and the predetermined dimension, the polishing of the inner peripheral of the connecting portion 104 isn't needed as distinct from the conventional hose. In this process invention, therefore, not only the polishing step is omissible, but also the cleaning step for removing the polishing powders is unnecessary, thereby the whole number of steps of the process can be reduced and the production cost can be decreased.

Further, in this process invention of the patent application, the inner peripheral surface of the connecting portion 104 can be formed more accurately in comparison with that of the connecting portion polished. Accordingly, for instance, when the mating member such as a metal pipe is inserted into the connecting portion of the hose, the reliability of the sealing capacity between the mating member and the hose is improved.

Furthermore, this process invention of the patent application is advantageous in achieving that the hose body can be made of hard resin and the connecting portion can be made of soft resin.

For example, in the case of the air duct hose for an automobile, since the negative pressure is applied to the hose during use of the hose, providing that the hose body is made of the soft material, the cross-section of the hose body is deformed, and the section thereof is reduced. Therefore, the pressure-loss of an air passing through the hose is increased, the amount of the passing-air is decreased, and thereby the incomplete combustion of the engine may be caused. Providing that the whole hose is made of a hard material with the object of preventing these problems, the sealing capacity between the hose and the mating member is decreased during connecting.

When the hose is made of the hard material and the connecting portion is made of the soft material in view of the above-mentioned process invention of the patent application, not only the hose can possess mechanical strength such as negative-pressure resistance, but also the sealing capacity between the connecting portion and the mating member can be improved. Of course, when a bellows portion is formed in the hose body, or when the bellows is made of soft resin, the hose can become more flexible.

By the way, in the case where the mating member is inserted into the hose, as shown in FIG. 10(A), a concaved portion 106, whose inner diameter is large, is formed at an end portion of the connecting portion 104, and the mating member is inserted into the concaved portion 106 for fixation. In this arrangement, however, when oscillation or bending force is applied to the hose, as understood from FIG. 10(B), a large strain or a large stress generates partially in the connecting portion 104 made of the soft material.

Therefore, cracks generate or progress in the connecting portion 104, the hose may come to be broken off finally.

The present invention has been developed in view of the solving of aforementioned problems.

DISCLOSURE OF INVENTION

A resin hose connecting structure according to the present invention comprises:

a resin hose including a hose body in which at least an end portion is made of a hard thermoplastic resin and is molded by a blow molding method, and a connecting portion formed coaxially and integrally with the end portion of the hose body and made of a soft thermoplastic resin, the connecting portion having an inserting inner peripheral surface has an inner diameter being equal to or larger than an inner diameter of the end portion of the hose body; and a mating member made of a structural material harder than the soft thermoplastic resin, having a tubular inserting end portion for inserting into the connecting portion of the resin hose, the tubular inserting portion including a ring-shaped contacting surface disposed at a head thereof and an inserting outer peripheral surface disposed a rear of the ring-shaped contacting surface, the inserting outer surface to be inserted into the inserting inner peripheral surface of the resin hose;

wherein the ring-shaped connecting surface of the tubular inserting end portion of the mating member is brought into contact with the end portion of the hose body, and the inserting outer peripheral surface of the tubular inserting end portion is fitted with the inserting inner peripheral surface of the connecting portion so that the resin hose and the mating member are connected together.

Advantageous effects accomplished in the above-mentioned patent application (Japanese Patent Application No.3-39145), in which the connecting portion is formed by the injection molding, are similarly obtained in the present invention. Further, in the present invention, the following advantageous effects are obtained. Namely, in the present invention, since the mating member is inserted into the resin hose through the connecting portion so that the mating member is brought into contact with the end portion of the hose body for fixation, even when oscillation or bending force is applied to the hose during use of the hose, it can be prevented that a large strain or a large stress generates partially in the connecting portion.

Also, in the connecting structure according to the present invention, the mating member is brought into contact with the end portion of the hose body, namely, the connecting portion made of the soft resin isn't substantially interposed between the end portion of the hose body and the mating member. Therefore, when the bending force or the like is applied to the hose, the phenomenon in which the soft portion between the end portion of the hose body and the mating member is bent greatly, isn't generated. And the bending force is equally applied to the whole hose in the present invention.

Therefore, in the present invention, in the case where the high-flexible portion such as the bellows portion is disposed at an intermediate portion of the hose body, the bending force is absorbed by the high-flexible portion, and thereby a large partial force isn't applied to the connecting portion made of soft resin.

Accordingly, the crack-generation or the crack-progress caused by the partial stress is suppressed, and the hose-life is improved.

In addition, the inner peripheral surface of the connecting portion made of soft resin isn't directly exposed to fluid, such as gasoline flowing through the hose, blowby-gas flowing from the engine, or the like, and thereby life-deterioration caused by the fluid can be avoided.

In the case of the filler hose in which the connecting portion made of soft resin is directly exposed to the gasoline, the gasoline penetrates through the wall of the hose outwardly. Because gasoline-penetration resistant of the soft resin is inferior to that of the hard resin. But, in the case where the connecting structure according to the present invention is applied to the filler hose, since the connecting portion made of soft resin isn't directly exposed to the fluid, the penetrated amount of the gasoline can be decreased.

Oil-resistant and blowby-gas resistant of the soft resin are inferior to that of the hard resin. Accordingly, in the case of the air duct hose, when the inner peripheral surface of the connecting portion made of soft resin is directly exposed, the inner peripheral surface of the connecting portion is easy to become deterioration. But, in the connecting structure according to the present invention, since the inner peripheral surface of the connecting portion isn't directly exposed to oil or blowby-gas, the hose-deterioration caused by them can be suppressed.

Further, since the connecting portion isn't directly exposed to the fluid in the present invention, it is possible to select the soft resin in which oil-resistant, blowby-gas resistant or the like isn't excellent but other properties are excellent. Therefore, it can be accomplished to select a material of the connecting portion optionally.

Furthermore, in the connecting structure according to the present invention, when the case where the connecting portion formed coaxially with the hose body comprises the inserting inner peripheral surface having an inner diameter being larger than that of the hose body, and when an inner diameter of the tubular inserting end portion of the mating member is in accordance with an inner diameter of the hose body, the fluid can flow smoothly through the resin hose and the mating member.

Since an amount of the soft resin material which is expensive can be decreased, the connecting structure according to the present invention is advantageous in reducing the production cost of hose.

BRIEF DESCRIPTION OF THE DRAWINGS

FIGS. 4(A), 4(B), 4(C), 4(D), 4(E) and 4(F) are drawings of the further modifications of the present invention.

BEST MODE FOR CARRYING OUT THE INVENTION

Next, the embodiments according to the present invention will be explained on the basis of the accompanying Figures.

Figure 2:
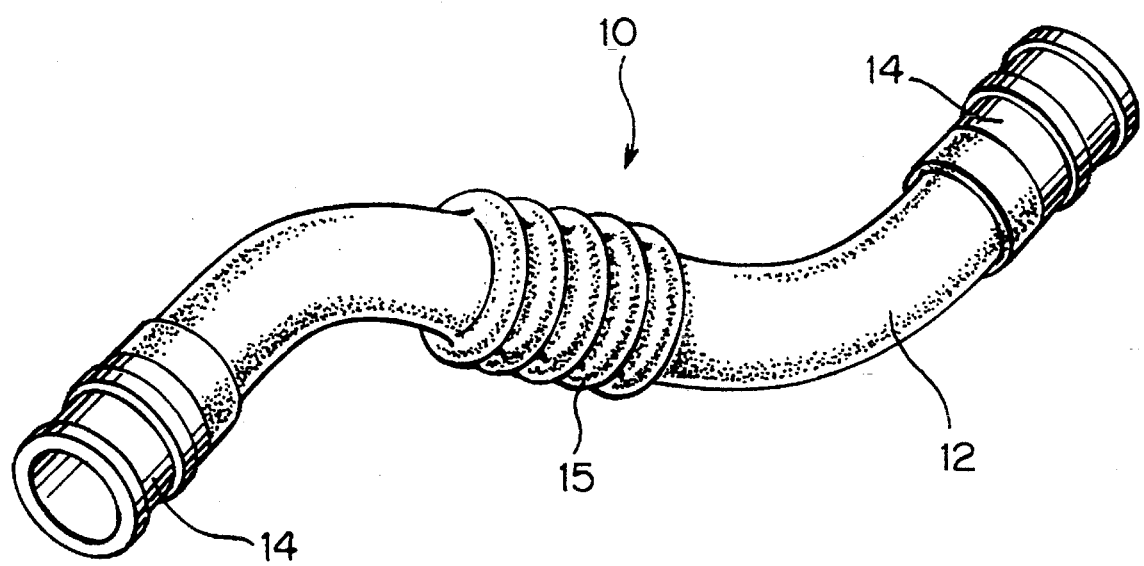
FIGS. 2 is a perspective drawing which shows the whole structure of the hose described in FIG. 1.

As shown in FIG. 2, numeral 10 shows a resin hose employed as an air duct hose or the like. This resin hose comprises a hose body 12 and a connecting portion 14. The hose body 12 is formed by blow-molding hard thermoplastic resin. The connecting portion 14 which is formed integrally with the hose body 12 and which is formed by injection-molding soft thermoplastic resin into a mold-die where the hose body 12 is disposed.

In the central area of the resin hose 10, a bellows portion is positioned for giving flexible property to the hose body 12. The bellows portion 15 may be made of soft resin for increasing the flexibility of the bellows portion 15.

In the hose 10, polypropylene resin having a Rockwell-hardness (R-scale) 94 (for instance: EC-9B, produced by Mitsubishi Petrochemical Co. Ltd.) can be exemplified as hard resin for molding the hose body 12, and the mixture of polypropylene resin and EPDM polymer-alloy having a Shore-hardness A 75 (for instance: Sant-plane 101-75, produced by Nippon Monsant Co. Ltd.) can be exemplified as hard resin for molding the connecting portion 14.

Figure 1A:
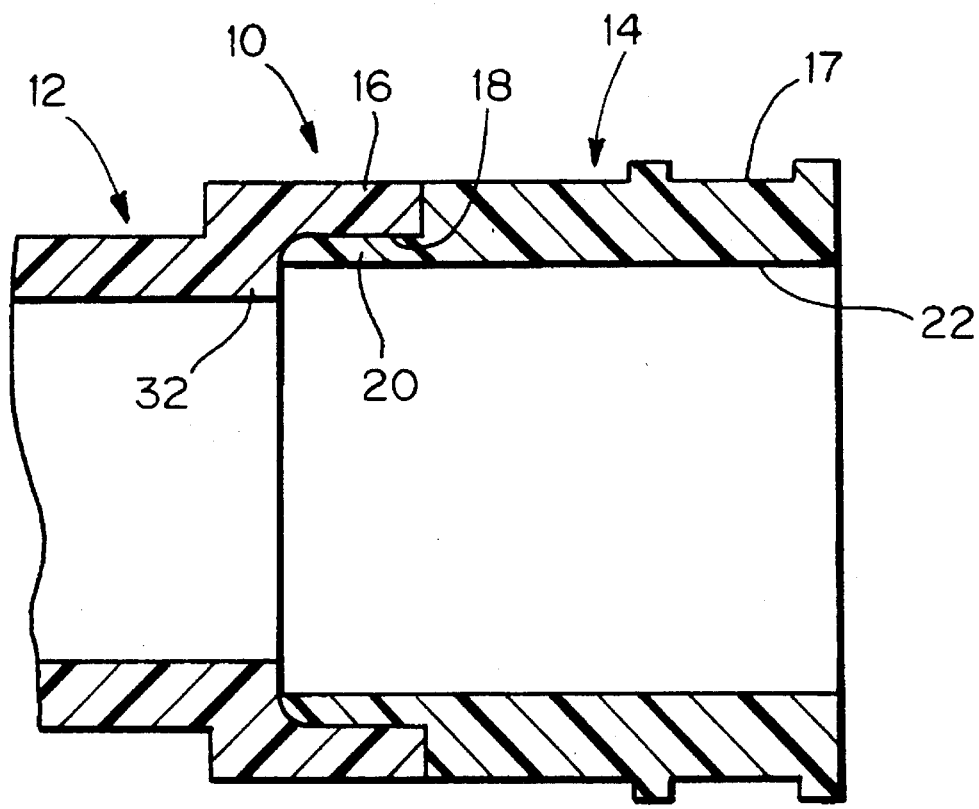
FIGS. 1(A) and 1(B) are drawings which show a hose connecting structure of a preferred embodiment according to the present invention.
Figure 1B:
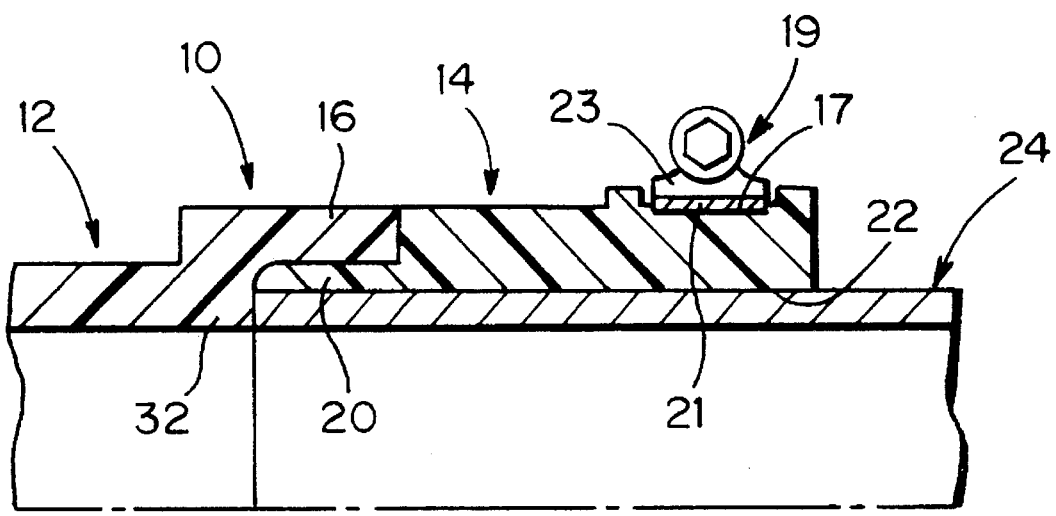

FIGS. 1(A) and 1(B) show a cross-sectional structure in the surroundings of the end portion of the hose 10. As shown in FIG. 1, in the hose 10 of the present embodiment, a large-diameter portion 16 is formed at an end portion of the hose body 12, and an expanded inner peripheral surface 18 is formed on an inside of the large-diameter portion 16.

A tubular-shaped projecting portion 20 extending in an axial direction is formed on the connecting portion 14, and the projecting portion 20 is piled so as to cover the expanded inner peripheral surface 18, and thereby the projecting portion 20 is integrated.

In the resin hose 10 of the present embodiment, an outer diameter of the connecting portion 14 is equal to an outer diameter of the large-diameter portion 16 of the hose body 12, an inner diameter of the connecting portion 14 is larger than an inner diameter of the hose body 12, and thereby the whole inner peripheral surface of the connecting portion 14 corresponds to an inserting inner peripheral surface 22.

A metal pipe 24, which constitutes the mating member of the present invention, is inserted into a tubular-shaped receiver hole defined by the inserting inner peripheral surface 22 through an opening of the connecting portion 14. The top-end of metal pipe 24 is brought into contact with an end surface of a stepped portion 32 of the hose body 12. Under these circumstances, a clamping member 19 is tightened at a clamping groove 17 positioned on the outer peripheral surface of the connecting portion 14, and thereby the hose 10 and the mating metal pipe 24 are fixed and connected. In the present embodiment, a ring-shaped top-end surface of the metal pipe 24 corresponds to the ring-shaped contacting surface of the present invention, and the outer peripheral surface of the head of the metal pipe 24 corresponds to the inserting outer peripheral surface of the present invention.

Here, the clamping member 19 includes a band 21 and a tightening member 23, the tightening member 23 is fastened by use of a bolt and so on, the band 21 is contracted in a radial direction, and thereby the connecting portion 14 is fastened inwardly. The clamping member 19 shown in FIG. 1(B) is a mere example of the present invention, other various clamping members being modified can be employed.

The inner diameter of the above-mentioned hose body 12 is equal to that of the mating metal pipe 24; so the inner peripheral surface of the hose body 12 is on a level with that of the metal pipe 24. Accordingly, a fluid can flow smoothly through the hose body 12 and the metal pipe 24.

In the case of the resin hose 10 according to the present embodiment, the top-end of the hard metal pipe 24 is directly brought into contact with the end surface of the stepped portion 32 of the hose body 12. Therefore, when compressive force is applied to the area between the resin body and metal pipe 24, the resin hose 10 can endure the relative large compressive force. Also, since the large-diameter portion 16 is formed with the hose body 12, the resin hose 10 can endure relative large oscillation or bending force applied to the hose 10.

Further, the bellows portion 15 positioned at the central area of the hose body 12 can absorbed oscillation or bending force; so a large-strain or a partial stress-concentration isn't generated in the connecting portion 14 made of soft resin. Therefore, the life of the hose 10 is improved.

Also, since the inner peripheral surface of the connecting portion 14 isn't directly exposed to the fluid flowing through the hose, such as blow-by gas, gasoline, oil and so on, the hose-deterioration caused by the chemical operation of the fluid is prevented, thereby improving the life of the hose.

Besides, it isn't required that the portion constituting the large-diameter portion 16 is made of soft resin whose cost is expensive; therefore, the consumed amount of the expensive soft resin can be reduced, and the production cost of hose can be reduced too.

As for the connecting structure comprising the hose 10 and the metal pipe 24, various structures can be employed in addition to the above-described embodiment.

FIGS. 3(A) to 3(D) show other preferred embodiments. In an embodiment shown in FIG. 3(A), a connecting portion 14 is formed in a straight-shape by an injection molding method so as to cover the outer peripheral surface of the end portion of the hose body 12, and an inner diameter of the connecting portion 14 is equal to an outer diameter of the hose body The inner peripheral surface of the connecting portion 14 which projects from the hose body 42 in an axial direction and which constitutes the inserting inner peripheral surface 22. The metal pipe 24 is inserted into the inserting inner peripheral surface 22, and thereby the top-end surface of the metal pipe 24 is brought into contact with the end surface of the hose body 12.

Figure 3A:
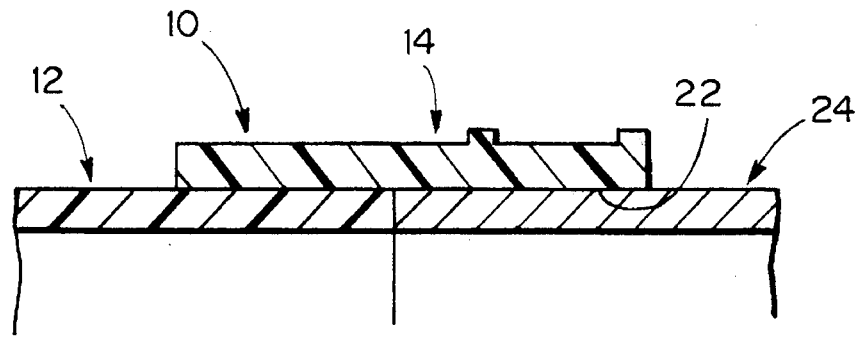
FIGS. 3(A), 3(B), 3(C) and 3(D) are drawings of the modifications of the present invention.
Figure 3B:
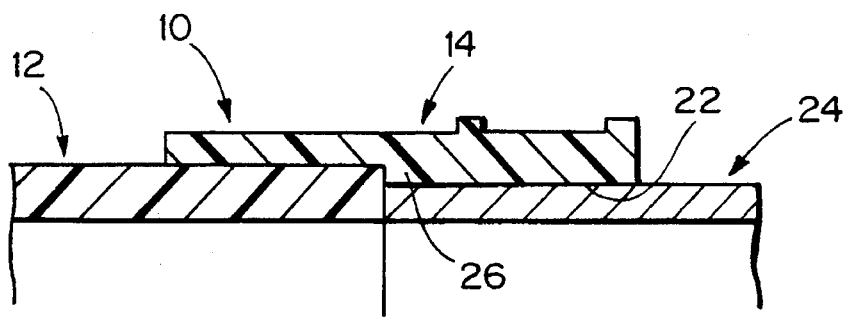

In an embodiment shown in FIG. 3(B), a connecting portion 14 is formed by an injection molding method so as to cover an outer surface being along a centrifugal direction of a hose body 12. A stepped portion 26 is positioned on the connecting portion 14, the stepped portion 26 covers a surface being along the centrifugal direction of the hose body 12, and thereby both is welded or fused to be formed integrally. An inner peripheral surface of the portion projecting from the hose body 12 in an axial direction constitutes an inserting inner peripheral surface 22 whose inner diameter is smaller than an outer diameter of the hose body 12. The outer peripheral surface of the metal pipe 24 is in contact with the inserting inner peripheral surface 22.

Figure 3C:
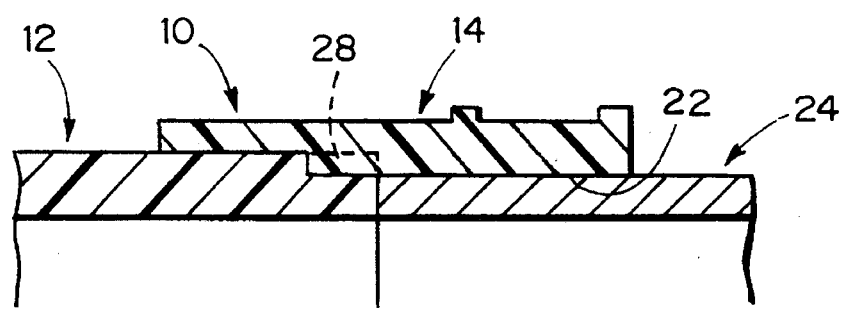

In an embodiment shown in FIG. 3(C), an edge portion 28 is cut off at an outer peripheral surface of an end portion of a hose body 12. After the hose body 12 having the edge portion 28 is set in the mold-die, a connecting portion 14 is formed by an injection molding method. An inserting inner peripheral surface 22 is positioned at an inside of the portion projecting from the hose body 12, and an inner diameter of the inserting inner peripheral surface 22 is equal to an outer diameter of the cut-off portion. A metal pipe 24 is inserted into the inserting inner peripheral surface 22.

Figure 3D:
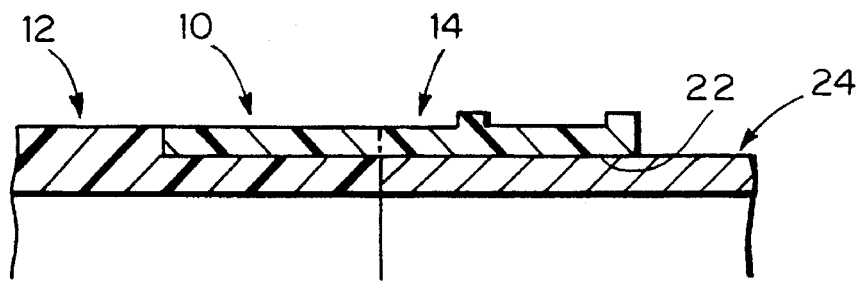

In an embodiment shown in FIG. 3(D), an outer peripheral surface of an end portion of a hose body 12 is cut off in a range extending at some length. After the hose body 12 having the cut-off portion is set in a mold-die, a connecting portion 14 is formed by an injection molding method. In this embodiment, an outer diameter of the connecting portion 14 is equal to an outer diameter of the hose body 12. In addition, an inserting inner peripheral surface 22 is positioned at the inside of the portion projecting from the hose body 12, the metal pipe 24 is inserted into the inserting inner peripheral surface 22 for fixation.

FIG. 4 and FIG. 5 show another preferred embodiments of the present invention.

The structure shown in FIG. 4(B) comprises a resin hose 10 shown in FIG. 4(A) and a metal pipe 24. An end portion of a hose body 12 constituting the resin hose 10 has a expanded portion including a stepped portion 33 whose inner diameter is continuously larger as it approaches an opening thereof. A connecting portion 14 is welded with a surface being along a centrifugal direction in the stepped portion 33 of the hose body 12, an inner peripheral surface and an axial end surface of the expanded portion of the resin hose.

Also, the connecting portion 14 includes an inserting inner peripheral surface 22 has an inner diameter being larger than an inner diameter of the hose body 12.

A ring-shaped projection portion 30 which is positioned at a top-end of the metal pipe 24 and which is encircled in a circumferential direction. In the present embodiment, an inclined surface disposed at a top-side of the projection portion 30 constitutes the ring-shaped contacting surface. By inserting the metal pipe 24 into the connecting portion 14, the outer peripheral surface of the leading end of the metal pipe 24 is fitted to the inserting inner peripheral surface 22, the projection portion 30 is brought into contact with the stepped portion 33 of the hose body 12 as shown in FIG. 4(B). In these circumstances, the clamping member 19 is tightened for fixing the metal pipe 24.

An outer diameter of the most projecting portion of the projection portion 30 is larger than the inner diameter of the inserting peripheral surface 22. Therefore, in the connecting structure shown in FIG. 4(B), the area of the inserting peripheral surface 22 being in contact with the projection portion 30 is elastically deformed, and thereby the inner diameter of the inserting peripheral surface 22 is partially enlarged in the radial direction. The projection portion 30 of the metal pipe 24 includes the expanded portion projecting in the centrifugal direction, the expanded portion of the projection portion 30 is partially engaged with the inside of the connecting portion 14, and thereby the hose 10 is connected with the metal pipe 24. Further, when the projection portion 30 of the metal pipe 24 is inserted into the inserting peripheral surface 22 of the connecting portion 14, the projection portion 30 enters the connecting portion 14 forcibly with a temporary expansion of the inserting peripheral surface 22.

In this embodiment, even when the hose 10 inclines to the metal pipe 24, the connecting structure of this embodiment is advantageous in maintaining the contacted condition in which the metal pipe 24 is brought into contact with the hose body 12.

In an embodiment shown in FIG. 4(C), a resin hose 12 having the same structure as the resin hose 12 shown in FIG. 4(A) is employed, and a metal pipe 24 differing slightly from the metal pipe 24 shown in FIG. 4(A) is employed. The metal pipe 24 shown in FIG. 4(C) has a tubular-shaped small-diameter portion 34 extending from a projection portion 30 in an axial direction. An outer peripheral surface of the small-diameter portion 34 is fitted to the inner peripheral surface of the hose body 12. The arrow in the drawing illustrates a clamping place where the hose is clamped by use of the clamping member (it is similarly in the following embodiments).

Further, in an embodiment shown in FIG. 4(D), a tapered portion 36 which corresponds to the ring-shaped contacting surface of the present invention and which is positioned at a head of a metal pipe 24 instead of the projection portion 30 shown in FIG. 4(C). A small-diameter portion 34 is extended from the tapered portion 36 in an axial direction. The tapered portion 36 is brought into contact with the stepped portion 33 of the hose body 12, and the small-diameter portion 34 is inserted into the inner peripheral surface of the hose body 12.

In embodiments shown in FIG. 4(E) and FIG. 4(F), other metal pipes 24 are employed. The metal pipe 24 has a slightly-narrowed head and a projection portion 37 disposed at a distance from the top-end of the metal pipe 24. An outer diameter of one side by way of the projection portion 37 is equal to that of the other side by way of the projection portion 37. The projection portion 37 differs from the projection portion 30 shown in FIG. 4(B) in the function: the projection portion 37 enters the inserting peripheral surface 22 of the connecting portion 14 forcibly, and thereby the projection portion 37 increases the sealing capacity of the contact area and operates as a resistant-portion for preventing the hose 10 coming off. The ring-shaped contacting surface of the present invention corresponds to an inclined surface which is slightly narrowed in a ring-shape at the top-end of the metal pipe 24 in the present embodiment.

The projection portion 37 shown in FIG. 4(E) acts a similar function except for a distance from the top-end of the pipe 14. The both sides facing by way of the projection portion 37 constitute the inserting outer peripheral surface of the present invention.

Figure 5G:
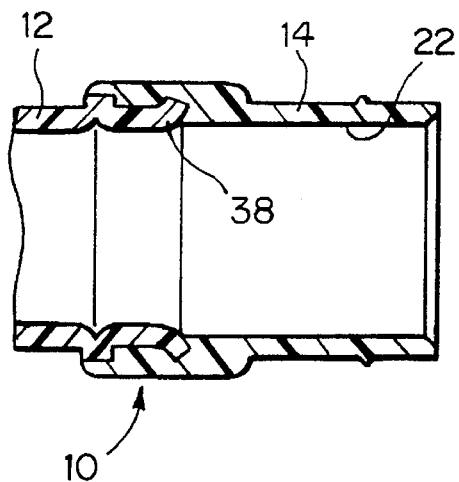
FIGS. 5(G), 5(H), 5(I) and 5(J) are drawings of the still further modifications of the present invention.
Figure 5H:
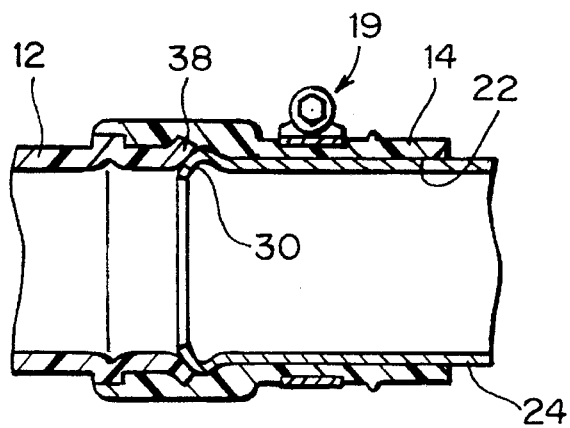

FIG. 5(G) and FIG. 5(H) show embodiments where an end portion of a hose body 12 is expanded in a trumpet-shape, a projection portion 30 of the metal pipe 24 is inserted into an inserting peripheral surface 22 and is brought into contact with the expanded end portion 38.

Figure 5I:
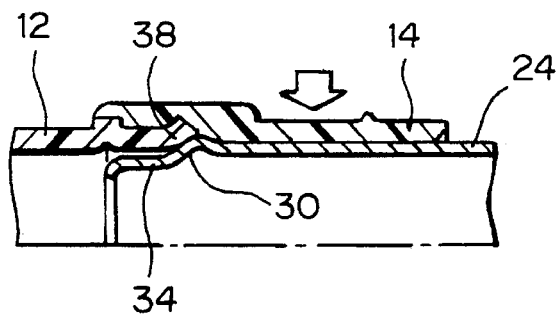

FIG. 5(I) shows an embodiment where a projection portion 30 of a metal pipe 24 is brought into contact with the expanded end portion 38 and the small-diameter portion 34 is inserted into the inside of the hose body 12.

Figure 5J:
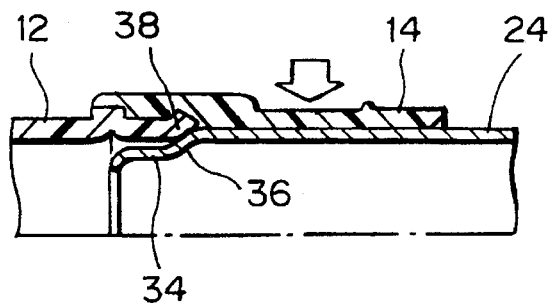

FIG. 5(J) shows an embodiment where a tapered portion 36 of a metal pipe 24 is brought into contact with the expanded end portion 38, and a small-diameter portion 34 of the head of the metal pipe 24 is inserted into the inside of the hose body 12.

Figure 6A:
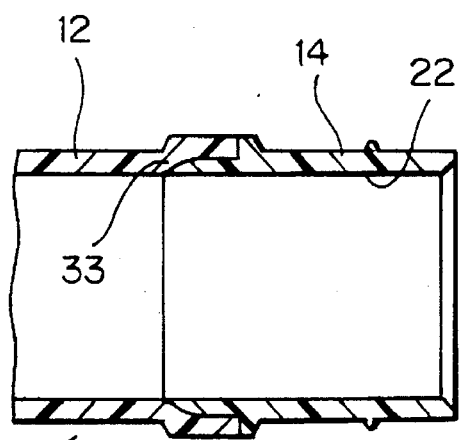
FIGS. 6(A), 6(B), 6(C), 6(D) and 6(E) are drawings of the still further modifications of the present invention.

FIGS. 6(A) to 6(E) show other various embodiments of the present invention. In these embodiments, a resin hose 10 shown in FIG. 6(A) is employed. An end portion of a hose body 12 constituting the resin hose 10 includes an expanded portion comprising a stepped portion 33 whose inner diameter is increasing as it approaches an opening. A connecting portion 14 is formed in order that the connecting portion 14 is welded with a surface of the stepped portion 33 of the hose body 12, the inner peripheral surface and the axial-end surface of the expanded portion. An inner diameter of an inserting peripheral surface 22 of the connecting portion 14 is equal to that of the hose body 12 shown in FIG. 6(A).

Figure 6B:
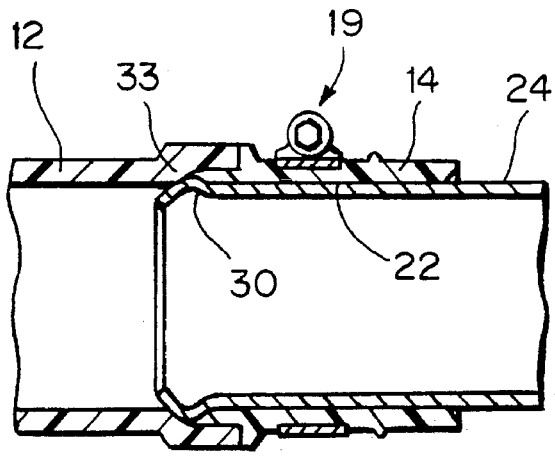

In an embodiment shown in FIG. 6(B), a ring-shaped projection portion 30 is formed at the top-end of a metal pipe 24 whose outer diameter is equal to an inner diameter of an inserting peripheral surface 22. An outer diameter of the summit of the projection portion 30 is larger than the inner diameter of the inserting peripheral surface 22. Therefore, when the metal pipe 24 is inserted into a connecting portion 14, the projection portion 30 enters the connecting portion 14 forcibly in an axial direction with a temporary expansion of the inserting peripheral surface 22, and the metal pipe 24 is stopped since it is brought into contact with the stepped portion 33 of the hose body 10.

Figure 6C:
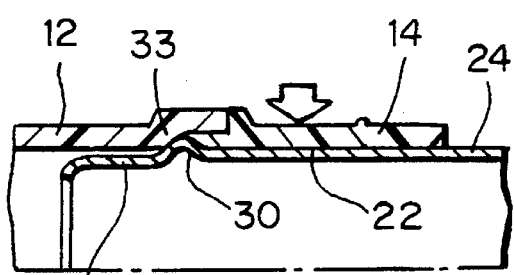

FIG. 6(C) shows an embodiment where a small-diameter portion 34 is positioned at the head of the metal pipe 24. An outer diameter of the small-diameter portion 34 is substantially equal to the inner diameter of the hose body 12, and the small-diameter portion 34 is inserted into the inside of the hose body 12.

Figure 6D:
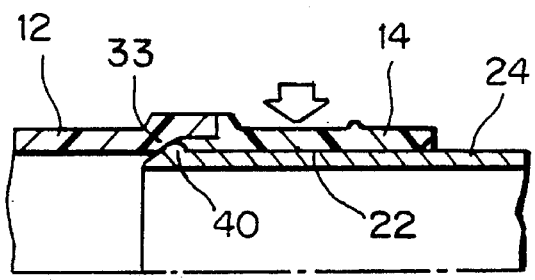

FIG. 6(D) shows an embodiment where a rib-like portion 40 having a semi-circle shape in cross-section is positioned at a top-end of the metal pipe 24. The rib-like portion 40 acts the similar function to the ring-shaped projection portion 30.

Figure 6E:
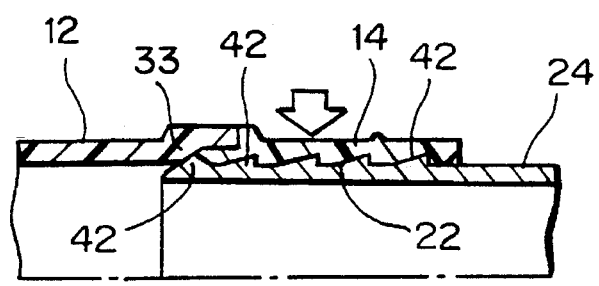

FIG. 6(E) shows a still another metal pipe 24, in which a plurality of ring-shaped protruding portions 42 are disposed at a predetermined intervals in an axial direction, so that the protruding portions 42 are formed in a sawing-shape and encircled in the circumferential direction. An inclined surface of the protruding portion 42 disposed at a top-end of the metal pipe 24 corresponds to the ring-shaped contacting surface of the present invention.

In each of the structures shown in FIG. 6(B), FIG. 6(C) and FIG. 6(D), the outwardly-expanded portion of the projection portion 30, the rib-like portion 40 and the protruding portion 42 are engaged with the inserting peripheral surface 22 of the connecting portion 14 made of the soft resin.

By the engagement of the inserting peripheral surface 22 and the mating member 24, it is effectively prevented that internal fluid enters a boundary between the connecting portion 14 and the metal pipe 24.

Further, under the condition that the clamping member is tightened, the projection portion 30, the rib-like portion 40 and the protruding portion 42 respectively work so as to prevent the metal pipe 24 and the hose 10 from disconnecting. An embodiment shown in FIGS. 7(A) to 7(F) features a resin hose 10. An end portion of a hose body 12 of a resin hose 10 comprises a large-diameter portion 16 having a stepped portion 33 whose inner diameter is continuously larger as it approaches an opening thereof, a connecting portion 14 is welded with the end surface and the outer peripheral surface of the large-diameter portion 16, and an inner diameter of the inserting peripheral surface 22 is equal to that of the large-diameter portion 16.

Figure 7A:
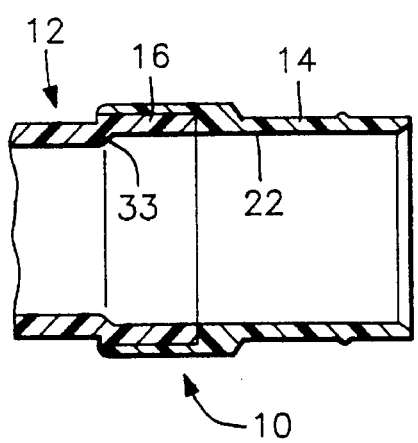
FIGS. 7(A), 7(B), 7(C), 7(D), 7(E) and 7(F) are drawings of the still further modifications of the present invention.
Figure 7B:
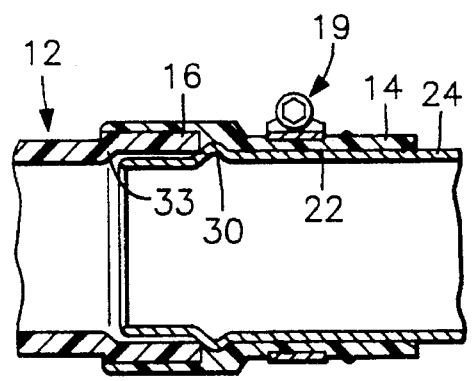
Figure 7C:
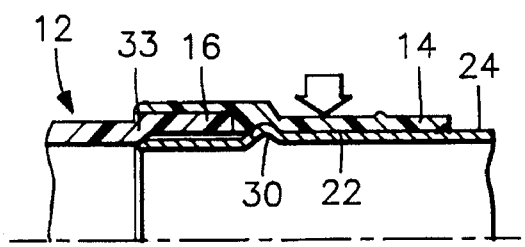

A metal pipe 24 shown in FIG. 7(B) and FIG. 7(C) has an outer diameter being the same size as an inner diameter of the inserting peripheral surface 22, a ring-shaped projection portion 30 is formed by bulging the head of the metal pipe 24. In the metal pipe 24 in shown FIG. 7(B), a tubular-shaped portion extending from the projection portion 30 is formed shortly in an axial direction, a ring-shaped inclined surface disposed at the projection portion 30 is brought into contact with the end surface of a large-diameter portion 16 of a hose body 12 in the engaged condition. Therefore, the ring-shaped inclined surface of this projection portion 30 corresponds to the ring-shaped contacting surface of the present invention.

In a metal pipe 24 shown in FIG. 7(C), a tubular-shaped portion which extends from a projection portion 30 and which is lengthened in an axial direction, the ring-shaped inclined surface disposed at the top-end of a metal pipe 24 is brought into contact with the stepped portion 33 of a hose body 12. Therefore, the ring-shaped inclined surface disposed at the top-end of the metal pipe 24 corresponds to the ring-shaped contacting surface of the present invention. The projection portion 30 has the same function as the projection portion 37 shown in FIG. 4(E).

When a length of the large-diameter portion 16 of the resin hose 10 shown in FIG. 7 is equal to a length of the tubular-shaped portion of the metal pipe 24, the ring-shaped inclined surface disposed on the projection portion 30 is capable of coming into contact with the end surface of the large-diameter portion 16 of the hose body 12, and the ring-shaped inclined surface disposed at the top-end of the metal pipe 24 is capable of coming into contact with the stepped portion 33 of the hose body 12. In this arrangement, the metal pipe 24 is brought into contact with the resin body 12 in two places which are positioned at predetermined intervals in an axial direction. The ring-shaped inclined surface of the projection portion 30 as well as the ring-shaped inclined surface of the top-end of the tubular portion of the metal pipe 24 corresponds to the ring-shaped contacting surface of the present invention.

Figure 7D:
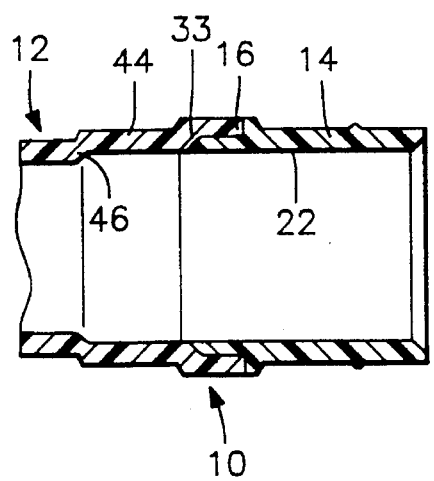
Figure 7E:
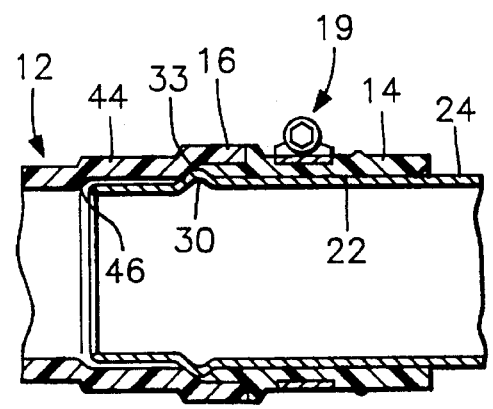
Figure 7F:
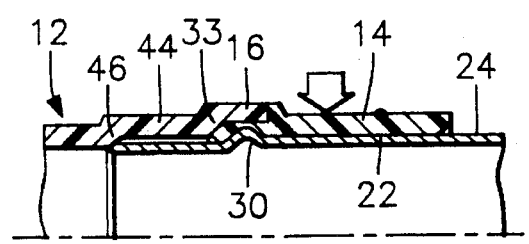

FIG. 7(E) and FIG. 7(F) show embodiments, where the resin hose 10 illustrated in FIG. 7(D) is employed instead of the resin hose illustrated in FIG. 7(A). The hose body 12 of the resin hose 10 comprises a middle-diameter portion 44 having a first stepped portion 46, and the large-diameter portion 16 having a stepped portion 33 extending from the end of the middle-diameter portion 44. The connecting portion 14 is welded with the end surface and the outer peripheral surface of the large-diameter portion 16, and an inner diameter of the inserting peripheral surface 22 is equal to that of the large-diameter portion 16. In these embodiments, a projection portion 30 of the metal pipe 24 is brought into contact with the stepped portion 33 of the large-diameter portion 16, or the top-end of the metal pipe 24 is brought into contact with the stepped portion 46 of the middle-diameter portion 44.

Figure 8A:
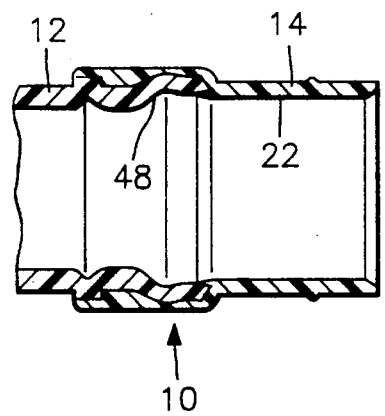
FIGS. 8(A), 8(B), 8(C), 8(D), 8(E), 8(F) and 8(G) are drawings of the still further modifications of the present invention.
Figure 8B:
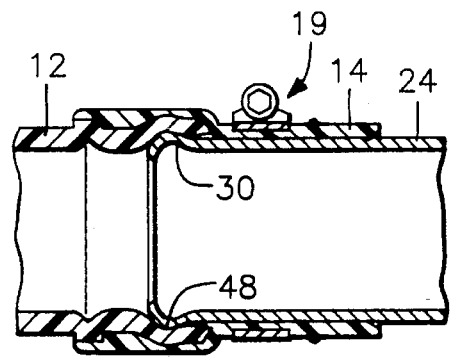
Figure 8C:
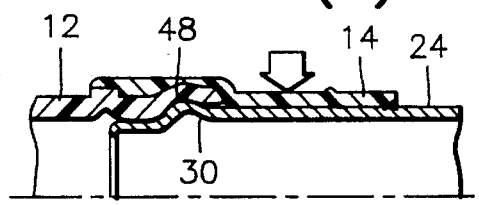
Figure 8D:
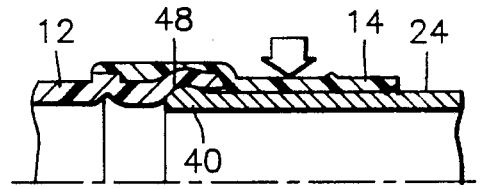
Figure 8E:
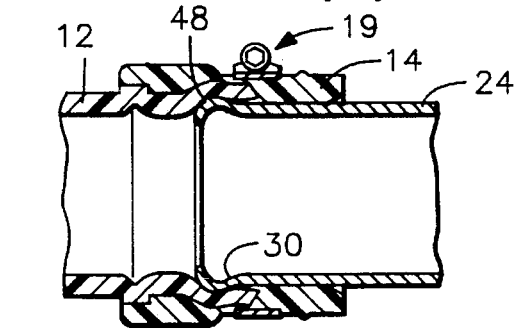
Figure 8F:
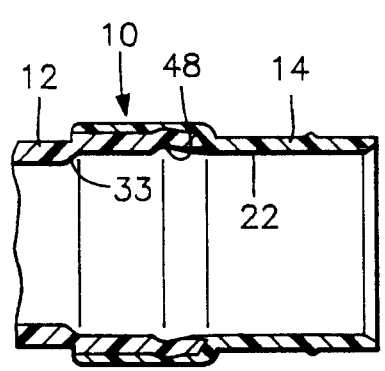
Figure 8G:
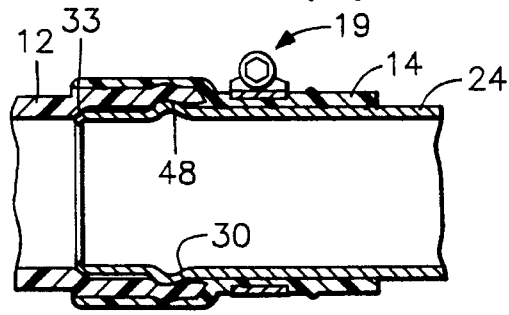
Figure 9A:
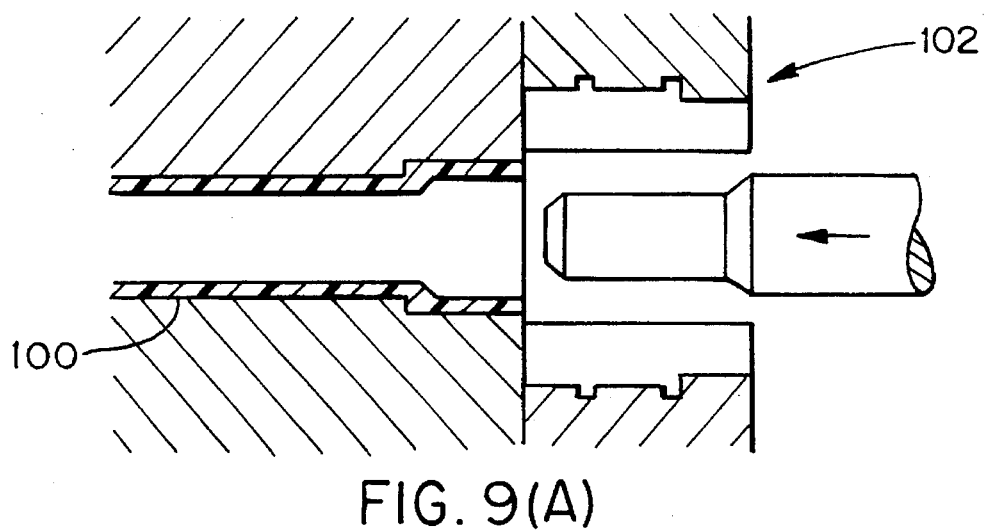
FIGS. 9(A), 9(B) and 9(C) are drawings of the still further modifications of the present invention.
Figure 9B:
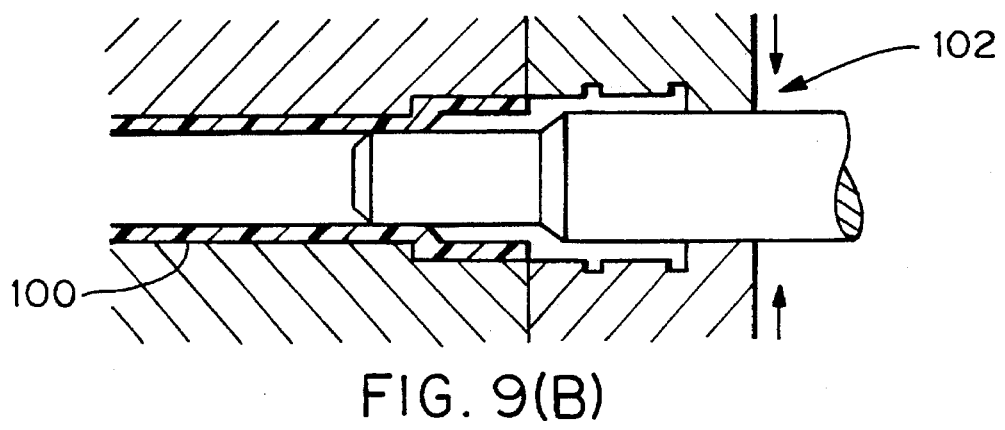
Figure 9C:
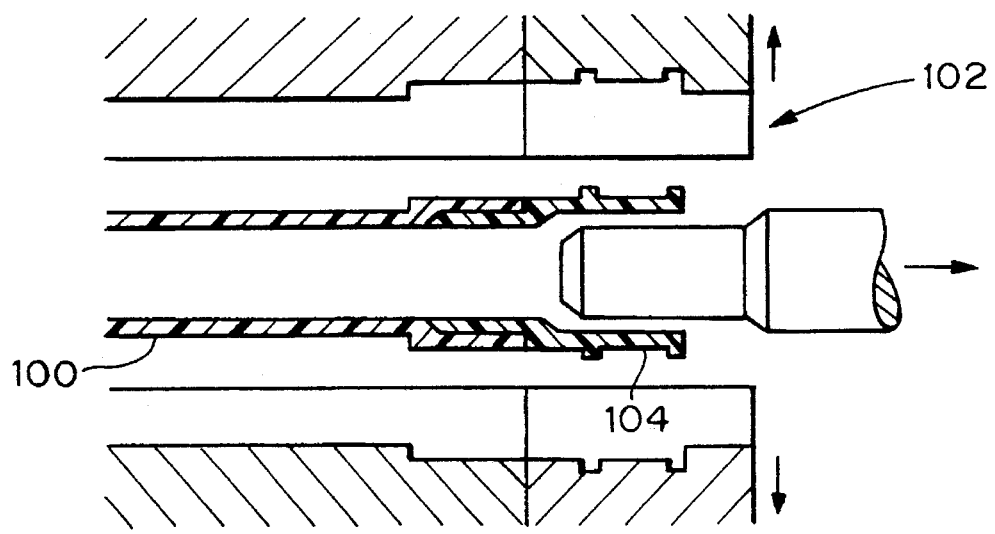
Figure 10A:
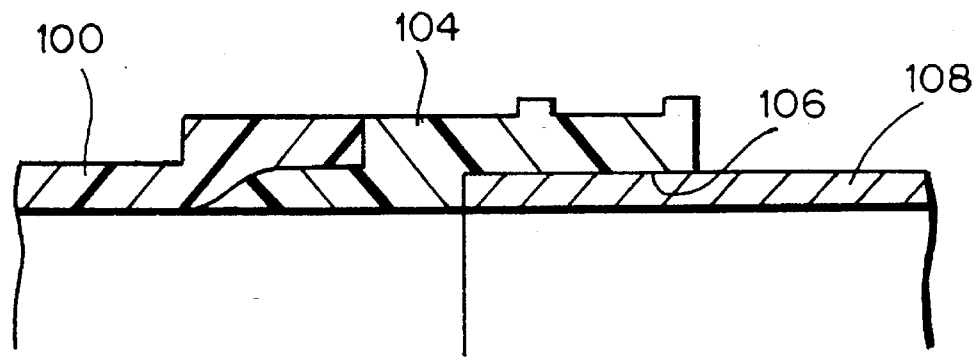
FIGS. 10(A) and 10(B) are drawings to explain the problems to be solved.
Figure 10B:
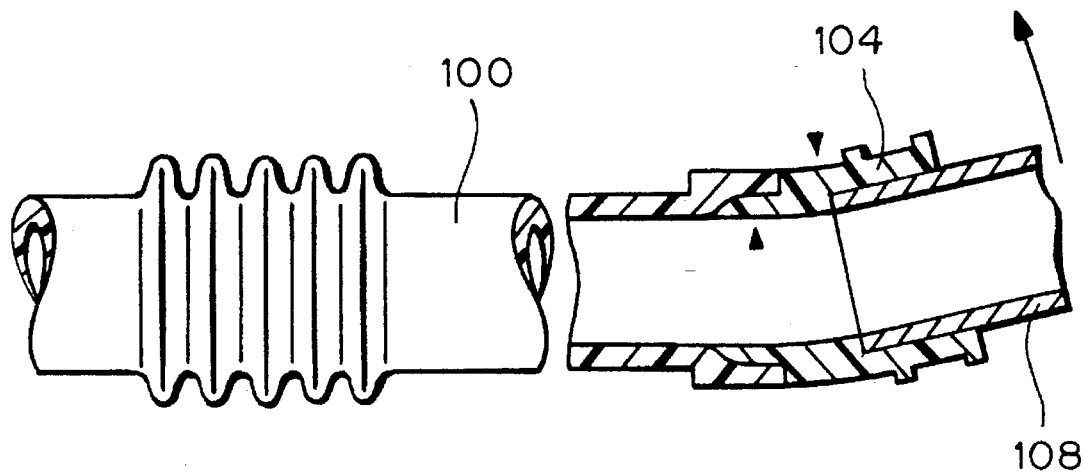

FIGS. 8(A) to (G) show the other embodiments. In these embodiments shown in FIG. 8(B), FIG. 8(C) and FIG. 8(D), as shown in FIG. 8(A), a ring-shaped convexed portion 48 is formed by expanding an inner peripheral surface of the hose body 12 slightly in a radial direction. A projection portion 30 or a rib-like portion 40 is elastically engaged with the convexed portion 48, and clamping is accomplished by clamping member 19 in the vicinity of the engaged area of the convexed portion 48.

Further, in an embodiment shown in FIGS. 8 (G) and 8 (F), a convexed portion 48 and a stepped portion 33 is formed in the hose body 12, the convexed portion 48 is elastically engaged with the projection portion 30 etc, and the top-end of the metal pipe 24 is brought into contact with the stepped portion 33.

Although the present invention has been detailed on the basis of the preferred embodiments thereof, they are mere examples. The following structural modifications is applicable in the present invention: not only the connecting portion positioned at the end portion in the axial direction is connected to the mating member, but also a connecting portion positioned at a midway portion of the hose is connected to a mating member. It will be apparent to one of ordinary skill in the art that many changes can be made without departing from the split or the scope of the present invention.

I claim:

1. A resin hose connecting structure comprising:

a resin hose including a hose body and a soft thermoplastic resin, injection molded connecting portion extending coaxially and integrally with a hard thermoplastic resin, blow molded end portion of said hose body, said connecting portion having an axially extending inner peripheral surface; and a mating member made of structural material having a tubular inserting end portion for inserting into said connecting portion of said resin hose, said tubular inserting end portion including a ring-shaped contacting surface disposed at a head thereof and an inserting outer peripheral surface disposed axially spaced from said ring-shaped contacting surface, said ring-shaped contacting surface to be contacted to the inner surface of said hose body and said inserting outer peripheral surface to be inserted into said inserting inner peripheral surface of said connecting portion of said resin hose;

said head of said tubular inserting end portion of said mating member being inserted at least to an abutting edge of said end portion of said hose body, and said inserting outer peripheral surface of said tubular inserting end portion is fitted with said inserting inner peripheral surface of said connecting portion with said connecting portion extending radially from said tubular inserting end portion and forming an exterior surface of said resin hose which receives of a clamping member entirely on said exterior surface of said resin hose on said connecting portion so that said resin hose is bendable at said connecting portion with respect to said end portion.

2. A resin hose connecting structure according to claim 1, wherein said end portion of said hose body for coming into contact with said ring-shaped contacting surface is an end surface of said end portion of said hose body.

3. A resin hose connecting structure according to claim 1, wherein said end portion of said hose body for coming into contact with said ring-shaped contacting surface is a tapered surface which is disposed at a side of an end surface of said hose body and which has sn increasing inner diameter as it approaches an opening thereof.

4. A resin hose connecting structure according to claim 1, wherein said end portion of said hose body for coming into contact with said ring-shaped contacting surface is a convexed portion which is made by expanding an inner peripheral surface annularly and slightly in a radial direction.

5. A resin hose connecting structure according to claim 1, wherein said end portion of said hose body includes a stepped portion and a large-diameter portion connected with said hose body by way of said stepped portion, and said end portion of said hose body for coming into contact with said ring-shaped contacting surface is at least one of an end surface of said stepped portion and an end surface of said large-diameter portion.

6. A resin hose connecting structure according to claim 1, wherein said end portion of said hose body includes a first stepped portion, a middle-diameter portion connected with said hose body by way of said first stepped portion, a second stepped portion, and a large-diameter portion connected with said middle-diameter portion by way of said second stepped portion, and said end portion of said hose body for coming into contact with said ring-shaped contacting surface is at least one of an end surface of said first stepped portion and an end surface of said second stepped portion.

7. A resin hose connecting structure according to claim 1, wherein said connecting portion is welded with at least an end surface of said hose body, and said inserting inner peripheral surface of said connecting portion is formed coaxially with an inner peripheral surface of said hose body.

8. A resin hose connecting structure according to claim 1, wherein said end portion of said hose body includes a stepped portion and a large-diameter portion connected with said hose body by way of said stepped portion, said connecting portion of said hose body is welded with at least one of an inner peripheral surface of said large-diameter portion and an end surface of said large-diameter portion, and an inner diameter of said inserting inner peripheral surface of said connecting portion is smaller than an inner diameter of said large-diameter portion.

9. A resin hose connecting structure according to claim 1, wherein said ring-shaped contacting surface of said mating member is an inclined surface which is formed at an end surface of said tubular inserting end portion.

10. A resin hose connecting structure according to claim 1, wherein said tubular inserting end portion includes a ring-shaped projection portion and said ring-shaped contacting surface of said mating member is an inclined surface which is formed at said projection portion.

11. A resin hose connecting structure according to claim 1, wherein said tubular inserting end portion of said mating member includes s tubular portion and a small-diameter portion disposed at a head of said tubular portion, said tubular portion having said inserting outer peripheral surface, said small-diameter portion whose outer diameter is smaller than an outer diameter of said tubular portion, and said ring-shaped contacting surface of said mating member is a ring-shaped tapered portion which connects said tubular portion with said small-diameter portion.

12. A resin hose connecting structure according to claim 1, wherein said tubular inserting end portion of said mating member includes a small-diameter portion which is disposed at an edge portion of said ring-shaped contacting portion and which is inserted into an inner peripheral surface of said hose body.

13. A resin hose connecting structure according to claim 1, wherein said tubular inserting end portion of said mating member includes a projection portion which projects annularly and which is engaged with said inserting inner peripheral surface of said connecting portion by enlarging said inserting inner peripheral surface in a radial direction.

14. A resin hose connecting structure comprising:

a resin hose including a hose body in which at least an end portion is made of hard thermoplastic resin and is molded by a blow molding method, and a connecting portion formed coaxially and integrally with said end portion of said hose body and made of soft thermoplastic resin, said connecting portion having an inserting inner peripheral surface with an inner diameter equal to or larger than an inner diameter of said end portion of said hose body; and a mating member made of structural material harder than said soft thermoplastic resin, having a tubular inserting end portion for inserting into said connecting portion of said resin hose, said tubular inserting portion including a ring-shaped contacting surface disposed at a head thereof and an inserting outer peripheral surface disposed axially spaced from said ring-shaped contacting surface, said inserting outer surface to be inserted into said inserting inner peripheral surface of said resin hose;

said ring-shaped connecting surface of said tubular inserting end portion of said mating member is brought into contact with said end portion of said hose body, and said inserting outer peripheral surface of said tubular inserting end portion is fitted with said inserting inner peripheral surface of said connecting portion so that said resin hose and said mating member are connected together, said tubular inserting end portion of said mating member includes a tubular portion and a small-diameter portion disposed at a head of said tubular portion, said tubular portion having said inserting outer peripheral surface, said small-diameter portion whose outer diameter is smaller than an outer diameter of said tubular portion, and said ring-shaped contacting surface of said mating member is a ring-shaped tapered portion which connects said tubular portion with said small-diameter portion.

* * * * *